No. 748,579. PATENTED JAN. 5, 1904.
G. BRYAR.
JOINT FOR LEAD PIPE.
APPLICATION FILED JUNE 1, 1903.
NO MODEL.
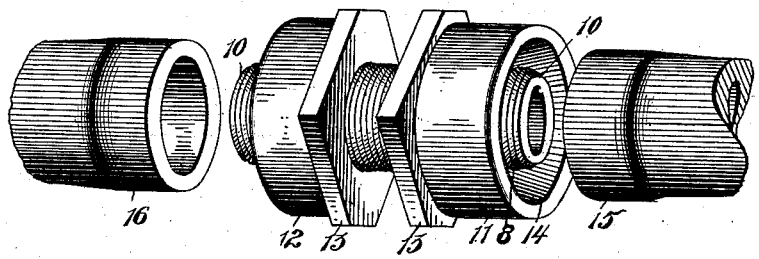
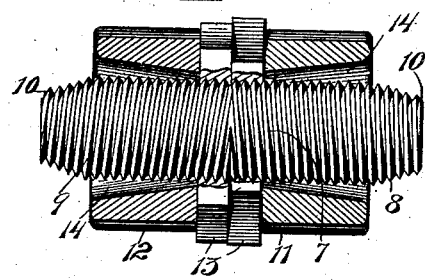
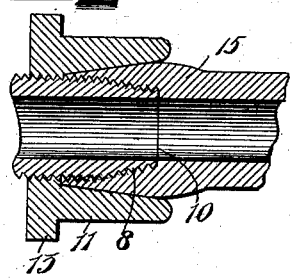
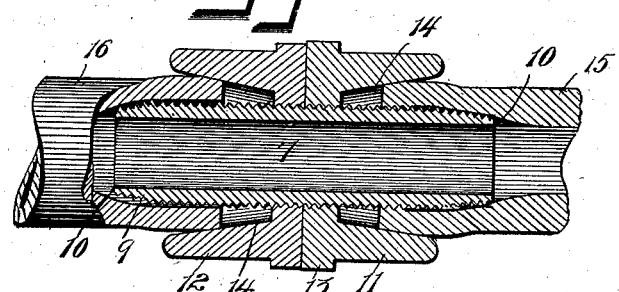
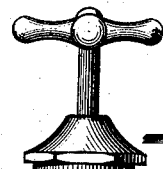
Witnesses:
J. F. Pattison
George W. Colles
Inventor
George Bryar.
By Marion & Marion
Attorneys No. 748,579. Patented January 5, 1904.

UNITED STATES PATENT OFFICE.

GEORGE BRYAR, OF ST. JOHN, CANADA, ASSIGNOR OF ONE-HALF TO MATHEW A. HARDING, OF ST. JOHN, NEW BRUNSWICK, CANADA.

JOINT FOR LEAD PIPE.

SPECIFICATION forming part of Letters Patent No. 748,579, dated January 5, 1904.

Application filed June 1, 1903. Serial No. 159,445. (No model.)

*To all whom it may concern:*

Be it known that I, GEORGE BRYAR, a subject of the King of Great Britain, residing at the city of St. John, county of St. John, in the Province of New Brunswick, Canada, have invented certain new and useful Improvements in Joints for Lead Pipe; and I do hereby declare that the following is a full, clear, and exact description of the invention, such as will enable others skilled in the art to which it appertains to make and use the same.

My invention relates to an improved joint especially adapted for lead and other soft-metal pipes and intended to take the place of the wiped joint now in common use by plumbers for joining two pieces of pipe together or a pipe to a brass fitting.

The object of my invention is to provide a joint which can be readily set up without any solder and in a few moments time will be absolutely tight and will resist a very great degree of tension or distortion; further, a joint which can be readily broken or disconnected whenever desired and reset in place without in any way disturbing the form of pipe and without any waste of material, and, finally, a joint which can be produced at a minimum of cost and which in the case of pipe-fitting attachments will cost practically no more than the fittings now in use.

My improved lead-pipe joint consists, substantially, in a threaded nipple, which is adapted to be thrust into the end of the pipe, and a recessed threaded sleeve, which is tapered or conical interiorly and is mounted on said nipple and adapted to be forced forward over the end of the lead pipe, whereby to impress the latter into the threads of the nipple, thus forming, substantially, a thread on the pipe itself, which can be again disengaged when it is desired to disconnect the joint by simply turning the piece on which the nipple is formed.

My invention further consists, where it is desired to join the ends of two pipes together, in a piece having two oppositely-threaded nipples—that is to say, right and left hand threads on its opposite ends and right and left hand threaded recessed sleeves thereon—which engage the respective ends to be connected and join them in the manner just mentioned, the arrangement being such that the pipe can be readily disconnected by simply rotating the two sleeves until they meet in the center, whereupon by further turning the piece having the nipples thereon will be unscrewed from the pipe ends and can be screwed up again in the same manner.

My invention consists, furthermore, in the constructions and combinations hereinafter described and claimed.

In the drawings accompanying this description I have illustrated my improved pipe-joint, and herein—

Figure 1 is a perspective view of the joint disconnected as formed for connecting the ends of two pipes together. Fig. 2 is a side elevation, partly in section, of the same joint. Fig. 3 is a central longitudinal section of the joint with the pipe ends in place ready to be set. Fig. 4 is a similar view showing the pipe when set in place. Fig. 5 is a side view of my improved joint as applied to a brass fitting.

The same numerals of reference denote like parts in all the figures of the drawings.

The form shown in Fig. 1 comprises a double nipple or coupling-piece 7, having right and left hand threads 8 and 9 on its opposite ends, each preferably being formed half the length and the two threads meeting in the center. At its ends the nipple is preferably tapered, as shown at 10. Engaging with the threads 8 and 9 are mounted two screw-sleeves 11 and 12, each having a polygonal head 13 on its inner end and being formed at its outer end with a central conical recess 14.

At 15 16 are shown the ends of two lead pipes which are to be joined together. The manner of procedure is as follows: The ends 15 and 16 are first spread or opened slightly with a mandrel or by other means, as shown, so as to enable them to pass over the taper ends 10 of the nipple and to be pushed in to some distance within the conical recesses 14, but not so far as the bottoms of these recesses. When so placed, the pipe ends will occupy the positions shown in Fig. 3. Each sleeve 11 12 is then screwed up into place, at the same time forcing the soft metal of the pipe in between the screw-threads, so as substantially to form a female thread on the pipe end in the manner shown in Fig. 4. This thread will absolutely fit the thread on the end of the nipple, so that no leakage can take place, and, furthermore, the exterior of the pipe will fit tightly against the wall of the interior of the recess 14, so as to strengthen the joint against leaking. It will be seen, moreover, that such a joint when the thread is properly formed will be one of great strength and cannot be pulled apart by ordinary force nor loosened.

It will be understood that ordinarily the nipple 7 has the same internal diameter as the pipe, so as to form a continuous bore when the pipe is set in place, thus avoiding any obstruction of the liquid passing through the pipe due to the change of diameter, which is common to a greater or less extent to nearly all joints or couplings.

When the joint is to be disconnected, it is simply necessary to unscrew each of the screw-sleeves 11 and 12 until they meet in the center, whereupon a further rotating movement causes the nipple 7 to be rotated with them, and thus unscrewed from both pipe ends simultaneously. This does not in any way injure the thread, so that the pipe can be readily recoupled by screwing them up again in place.

Fig. 5 shows my improved joint as applied to a fitting, such as a valve 17, this being formed with right and left hand threaded nipples 8' 9' on its two ends, each provided with a screw-sleeve 11' 12'. The mode of connecting and disconnecting the joints in this case is the same as before, except that the valve-handle may be used in place of a wrench in unscrewing the joint. Of course the use of this fitting does not necessarily imply the use of two sleeves, because if, for instance, it be a faucet or bib or other connection having a pipe attached to only one end one of the nipples would be omitted, as will be readily understood. The cost of such fitting should be no greater than that of fittings now in use.

It will be understood, of course, that the use of my improved joint does not necessarily imply the use of right and left hand threads, as the same may be also used with a continuous right-hand thread, if desired, on the nipple 7; but the use of a right and left thread is preferable, the essence of my invention being the threaded nipple and the manner of forming a thread on the pipe by pressing the material thereof into the grooves of the nipple.

Changes within the scope of the following claims may be made in the form and construction of the parts without departing from the spirit of my invention, and I desire it to be understood, therefore, that I reserve the right to make such modifications in the form and dimensions as will be apparent to those skilled in the art.

Having thus described my invention, what I claim as new, and desire to secure by Letters Patent, is—

1. A pipe-joint for lead and other soft-metal pipes comprising a nipple threaded at the end, and a screw-sleeve engaging the threads of said nipple and having a conical outwardly-diverging recess therein.

2. A pipe-coupling comprising a threaded nipple tapered at both ends, and a pair of screw-sleeves engaging the threads of said nipple and each having a conical outwardly-diverging smooth-faced recess in its outer side adapted to project over and engage the end of the pipe.

In witness whereof I have hereunto set my hand in the presence of two witnesses.

GEORGE BRYAR.

Witnesses:
 JOHN MITCHELL,
 CHAS. E. REYNOLDS.